3,038,872
RUBBER VULCANIZATE COMPRISING A METAL-LO-CARBOXYLATE POLYMER OF A CONJUGATED DIENE, A BUTADIENE COPOLYMER AND SILICA, AND PROCESS FOR PREPARING SAME
Ralph F. Wolf, Akron, Ohio, assignor, by mesne assignments, to Pittsburgh Plate Glass Company
No Drawing. Filed Nov. 29, 1957, Ser. No. 699,483
7 Claims. (Cl. 260—41.5)

The present invention relates to rubber vulcanizate compositions having improved wear resistance. More particularly, the instant discovery concerns vulcanizates containing finely-divided, precipitated, hydrated silica and an elastic, metallo-carboxylate polymer of an open-chain aliphatic conjugated diene.

Many uses to which rubber vulcanizates are subjected require that they have exceptional hardness and abrasion resistance. Typical of these uses is that of top lifts for ladies' shoes. Since fashion has introduced narrower heels, the size of these top lifts for ladies' shoes has decreased, the weight per unit area has increased and the demand for greater hardness and abrasion resistance in top lift compounds has increased proportionately.

Because of their small size, present-day top lifts take a severe pounding. They must be hard enough so they do not spread, resilient enough so they do not split and very resistant to abrasion so they do not wear off at the back edge in relatively short periods of time. Furthermore, the demand for light-colored stock as well as durable stock has increased significantly.

Since conventional sole and heel vulcanizates have proven unsatisfactory for the rigorous use to which small heel lifts, for example, are presently being subjected, rubber compounders have been hard-pressed to provide an elastomer which will stand up under such use.

The instant discovery, however, provides a solution to the problem and makes possible a rubber vulcanizate having exceptionally high abrasion resistance and hardness while still maintaining the resilience required for many uses. By so doing the present invention affords a novel composition which has a number of other industrial uses as well, such as in casters, skate wheels, football shoe caulks and the like.

According to the present invention, a novel rubber vulcanizate having improved wear resistance has been prepared which comprises an elastic, metallo-carboxylate polymer of an open-chain, aliphatic conjugated diene, a member selected from the group consisting of butadiene-styrene copolymers and acrylonitrile-butadiene copolymers, and from 20 to 90 parts by weight per 100 parts of the combined weight of said polymers of a finely-divided, hydrated silica having an average ultimate particle size below 0.1 micron and a surface area ranging from 25 to 400 square meters per gram, preferably from 50 to 250 square meters per gram.

Among the many features afforded by the instant discovery is the fact that not only is the need for vulcanizates having exceptional hardness and abrasion resistance met, but there is no sacrificing of the modulus, tensile and tear resistance required in conventional sole or heel stock. This is indeed significant.

According to a preferred embodiment of the present discovery, the elastic, metallo-carboxylate polymer of an open-chain, aliphatic conjugated diene is present in the vulcanizate in the proportion of 25 to 95 parts by weight based upon 100 parts by weight of the total polymeric content of the vulcanizate, preferably from 35 to 85 parts by weight. For example, a particularly suitable vulcanizate may contain finely-divided, precipitated silica of the type described hereinafter, 50 parts by weight of an elastic, metallo-carboxylate copolymer of butadiene-acrylonitrile, and a rubber-like, synthetic butadiene-styrene copolymer (GR–S) in the amount of 50 parts by weight.

The copolymers other than the elastic, metallo-carboxylates of open-chain, aliphatic conjugated dienes, such as the butadiene-styrene copolymer, are present in the vulcanizate composition in the amount of 5 to 75 parts by weight, preferably 15 to 65 parts by weight, basis 100 parts by weight of the total polymer content of the composition. One or both of these two copolymers may be present in the vulcanizate at one time. For example, a recipe containing a modified (metallo-carboxylate) acrylonitrile-butadiene copolymer, GR–S and/or acrylonitrile-butadiene copolymer (Hycar 1042) is contemplated, providing the proportions given above are respected, i.e., the 5 to 75 parts by weight concentration may be made up of both of these constituents or only one thereof.

The elastic, metallo-carboxylate polymers of an open-chain, aliphatic, conjugated diene contemplated herein are, in general, prepared as defined in U.S. Patents 2,662,874, 2,669,550 and 2,681,327, wherein polymers of an open-chain, aliphatic, conjugated diene, such as homopolymers of the dienes and copolymers thereof with other copolymerizable materials, are reacted with carboxylating or carboxyl-supplying reagents, sometimes in the presence of an oxidizing agent, such as a peroxygen compound, to produce carboxylated polymers containing from 0.001 to 0.30 chemical equivalent by weight of combined carboxyl (—COOH) groups for each 100 parts by weight of polymer. The resulting carboxylated or carboxyl-containing polymers (or polymeric adducts) undergo elasto-condensation reactions with polyvalent metallic oxides to produce elastic, metallo-carboxylate polymers of the type contemplated herein.

Typical polymers and copolymers to be carboxylated comprise a predominant proportion of a conjugated diene, such as the butadiene-1,3 hydrocarbons, including butadiene-1,3 itself, 2-methyl butadiene-1,3, 2,3-dimethyl butadiene-1,3, piperylene, 2-neopentyl butadiene-1,3 and other hydrocarbon-substituted homologs of butadiene-1,3, and in addition such substituted dienes as 2-chloro butadiene-1,3, 2-cyano butadiene-1,3, and others, as well as other dienes including the straight-chain pentadienes, the straight and branch-chain hexadienes and others. Monomers of these dienes may be homopolymerized or monomeric mixtures thereof copolymerized.

On the other hand, copolymers of these monomers or monomeric mixtures may be produced with minor proportions of one or more other copolymerizable materials including the mono-olefinic monomers, such as vinylidene chloride, acrylonitrile, methacrylonitrile, chloroacrylonitrile, the alkyl esters and amides of acrylic and alpha-alkyl acrylic acids, such as methyl acrylate, ethyl acrylate, butyl acrylate, 2-ethylhexyl acrylate, methyl methacrylate, methyl ethacrylate, butyl methacrylate, lauryl methacrylate, N,N'-dimethyl acrylamide, and others; vinyl substituted cyclic compounds such as styrene, vinyl naphthalene, vinyl pyridine and others, and in addition such monomers as p-divinyl benzene, diallyl maleate, isobutylene and others.

The polymers found particularly useful for the production of carboxylated polymers range from the homopolymers of the dienes such as polybutadiene, polyisoprene, and the like, to polymers produced from monomeric mixtures comprising from 50 to 99 percent by weight of a diene and from 1 to 50 percent by weight of one or more of the above comonomers.

The preferred carboxylating agents are thioglycollic acid, beta-mercapto propionic acid, thiosalicyclic acid, maleic acid, maleic anhydride and acrylic acid, because of their ready availability, low cost, and their compatibility and reactivity with synthetic rubbery materials.

The peroxygen compounds or catalysts which may be used for efficient reaction of the carboxylating agent with the polymer may be any of the organic peroxides, such as benzoyl peroxide (preferred) o,o'-dichlorobenzoyl peroxide, caproyl peroxide, caprylyl peroxide, pelargonyl peroxide, cumene hydroperoxide, tertiary butyl hydroperoxide, 1-hydroxycyclohexyl hydroperoxide, tertiary butyl diperphthalate, tertiary butyl perbenzoate, and the inorganic peroxygen compounds, such as potassium persulfate, sodium perborate and the like, and others. Benzoyl peroxide because of its low cost, its compatibility with rubbery materials and its activity is the preferred catalyst.

The amount of peroxygen compound used, if any, as a carboxylating catalyst is not critical and may be varied somewhat. Amounts of a peroxygen compound, such as benzoyl peroxide, varying from as little as 0.5 to 1.0 part by weight per 100 parts by weight of rubbery polymer to as much as 10 to 15 parts by weight may be utilized. In general, a preferred amount is from about 1.0 to about 10 parts by weight.

Conversion of the plastic carboxyl-containing polymeric adduct to an essentially elastic condition is brought about by reacting it with a polyvalent metallic oxide, such as the oxide of zinc (preferred), magnesium, calcium, cadmium, titanium, aluminum, barium, strontium, copper(ic), cobalt, tin, iron, lead and others, and heating the resulting composition. Specifically, zinc oxide, calcium oxide, cadmium oxide (CdO), magnesium hydroxide, dibutyl tin oxide, tin oxide (SnO), lead oxide (PbO), barium oxide, cobalt oxide ($Co_2O_3$), strontium oxide (SrO), and others produce superior results and are preferred.

The amount of polyvalent metallic oxide curing or elasticizing agent desired for efficient elasticization will vary somewhat depending on the carboxyl content of the rubbery material, on the metallic oxide itself and on its state of division and compatibility with the rubbery material. While as little as one part by weight of a metallic oxide, such as zinc oxide, per 100 parts by weight of rubber material will effect a detectable degree of cure of one of the polymeric adducts of this invention, it has been found that an empirical relationship exists between the carboxyl content of the polymeric adduct and the amount of metallic oxide employed. It has been found desirable to employ an amount of metallic oxide chemically equivalent to at least one-half the carboxyl groups of the polymer. Use of increased amounts of polyvalent metallic oxide induces corresponding improvements in the properties of the polymeric metallo-carboxylates. For the latter reason it is preferred to utilize amounts of metallic oxide of twice or more the amount chemically equivalent to the carboxyl content of the polymer.

The amount of carboxylating agent employed to produce a carboxylated rubber will vary somewhat according to the amount of carboxyl (—COOH) desired therein. When carboxylation is performed by masticating a mixture of the rubbery diene polymer and a carboxylating agent, all of the carboxylating agent remains in the rubber and the unreacted portion, if any, is difficult to determine. In solution carboxylation the product is generally recovered by precipitation so that the precipitate is essentially free of unreacted carboxylating agent and generally contains less than theoretical amounts of carboxyl. For these reasons, it is generally desirable to utilize amounts of carboxylating agent at least chemically equivalent to, and preferably from 1½ to 3 times, the carboxyl content desired in the product. Thus, when thioglycollic acid is the carboxylating agent from 0.001 to 0.30 mole per 100 parts by weight of polymer, or from about 1 part to about 83 parts by weight per 100 parts of rubbery diene polymer, is utilized. In general, from about 2 to about 40 parts by weight of a carboxylating agent per 100 parts of a rubbery polymer is sufficient.

A typical elastic, metallo-carboxylate copolymer of the type contemplated herein is known as a medium high butadiene-acrylonitrile copolymer modified with carboxylic groups in its polymer chain. It is sold under the trade name Hycar 1072 by the B. F. Goodrich Chemical Company, Cleveland, Ohio. While Hycar 1072 is a preferred polymer the invention is not limited thereto, since modified polymers and copolymers of the general type disclosed and further defined in U.S. Patents 2,662,874, 2,669,550, 2,681,327, and the like, are within the purview of the instant discovery.

An especially desirable reinforcing pigment or filler for the instant discovery is prepared by acid precipitation of an alkali metal silicate under carefully controlled conditions, as hereinafter described. The resulting silica generally contains at least 90 to 95 percent by weight $SiO_2$ on an anhydrous basis, i.e., free of "bound water" and "free water." The term "free water" denotes water which may be removed from the silica by heating it at a temperature of 105° C. for a period of 24 hours in a laboratory oven. The term "bound water" is intended to mean the amount of water which is driven off a siliceous pigment by heating the pigment at ignition temperature, for example, 1000° C. to 1200° C., until no further water can be removed, minus the amount of free water in the pigment.

Silica of the type contemplated herein generally is pulverulent and has a surface area of 25 to 400 square meters per gram, preferably 50 to 250 square meters per gram. The surface area of the silica may be measured by the Brunauer-Emmett-Teller method described in the Journal of the American Chemical Society, vol. 60, page 309 (1938).

The silica particles are in the form of flocs of loosely agglomerated particles. Thus, while the ultimate particle size of the precipitated silica as observed by the electron microscope is in the range of 0.015 to 0.05 micron, the floc particle size is larger, usually ranging from 0.1 to 10 microns.

Precipitation of a silica of the type required herein can be effected by the addition of carbon dioxide to sodium silicate solution according to the conditions disclosed in an application of Fred S. Thornhill, Serial No. 533,043, filed August 23, 1955, now Patent No. 2,940,830.

When the alkali metal silicate used in preparing a finely-divided pigment of the quality contemplated herein is sodium silicate, it should normally have the composition $Na_2O(SiO_2)_x$, where $x$ is at least 2, usually to to 4, including fractional numbers, preferably in the range of 3 to 4. The silicate solution generally contains 10 to 100 grams of $SiO_2$ per liter.

In order to illustrate several methods of preparing silica having the required properties for use in this invention, the following examples are given in which, unless otherwise specified, percentages are given by weight.

EXAMPLE I

Seventeen-thousand gallons of a sodium silicate solution is placed in a 50,000-gallon tank. This solution contains the sodium silicate $Na_2O(SiO_2)_{3.3}$ in amount sufficient to establish an $Na_2O$ concentration of 20.3 grams per liter. This solution contains no sodium chloride except that minor amount (less than 0.08 percent) usually present in commercial sodium silicate. The solution is held at a temperature of 75° C., plus or minus 5° C. Carbon dioxide gas containing 10.0 to 10.8 percent $CO_2$, the balance being nitrogen and air, is introduced into the solution at gas temperature of 46° C. to 63° C. and at a rate sufficient to provide 1250 cubic feet of the carbon dioxide gas per minute (measured at 760 millimeters pressure at 0° C.). This gas is introduced directly under a turbo-agitator in a manner to achieve uniform distribution of gas and the resulting mixture vigorously agitated. Carbon dioxide introduction is continued at this rate for 8½ hours, at which time about 120 to 140 percent of the theoretical amount of $CO_2$ has been introduced. After this period of 8½ hours the rate of introduction of carbon dioxide is reduced to 400 cubic feet per minute and the solution is boiled for 1½ hours. The slurry is then treated with sufficient HCl to lower the pH to 7, after which the slurry is filtered and washed. The resulting silica has a surface area of 140 to 150 square meters per gram.

EXAMPLE II

A 90-liter autoclave kettle provided with a heating and cooling coil, an agitator and a metal thermometer was charged with 12,850 grams of sodium silicate solution containing 976 grams of $Na_2O$ and 3115 grams of $SiO_2$. The solution was diluted to 48 liters total volume and its temperature raised to 95° C. The solution was carbonated with 100 percent $CO_2$ and a carbonation rate was used such as to introduce the theoretical amount of $CO_2$ in about 30 minutes. Carbonation was continued at this rate for about 1 hour, at the end of which time the pH of the slurry was 9.85.

The resulting slurry was filtered and washed twice with hot water. The filter cake was reslurried and adjusted to a pH of 6.75 by adding 400 cubic centimeters of 3.5 N HCl thereto. The acidified slurry was then filtered and the filter cake washed nearly chloride-free with hot water, after which the precipitate was dried at 105° C. in a forced draft laboratory oven, then micro-pulverized and conditioned at 50 percent humidity and 23° C. overnight. The finished pigment had a pH of 8.2. Its B.E.T. surface area was 148 square meters per gram.

The silica can be filtered more easily when the slurry is alkaline and hence, in general, it is desirable that the pH of the slurry be, say, 7 to 9 at the time it is filtered. However, superior dispersion results with pigments obtained from acidic slurries having a pH of 3 to 6.5. An effective compromise may be had by working at slurry pH values between 5 and 8.

Illustrative of the improved vulcanizates afforded by the present invention are those formulated according to the following recipes wherein the proportions are given in parts by weight based upon 100 parts by weight of the total polymer content thereof:

Table 1

|  | A | B | C |
|---|---|---|---|
| Hycar 1072 [1] | 50.0 | 50.0 | 50.0 |
| Hycar 1042 [2] | 50.0 | 50.0 |  |
| GR-S 1502 [3] |  |  | 50.0 |
| Zinc Oxide | 5.0 | 5.0 | 5.0 |
| Hard Clay |  | 40.0 |  |
| Santocure (n-cyclohexl-2-benzothiazole sulfenamide) | 1.5 | 1.5 |  |
| Mercaptobenzothiazyl disulfide |  |  | 2.0 |
| Tetramethylthiuram disulfide | 0.5 | 0.5 |  |
| Diorthotolylguanidine |  |  | 0.25 |
| Sulfur | 2.0 | 2.0 | 3.0 |
| Coumarone-indene resin (100° C. melting point) | 10.0 | 10.0 | 10.0 |
| Triethanolamine |  |  | 1.0 |
| Stearic acid | 1.0 | 1.0 | 3.0 |
| Silica prepared as in Example I, above | 60.0 | 60.0 | 80.0 |

[1] A medium high acrylonitrile-butadiene polymer modified to include carboxylic groups in the polymer chain. Sold by B. F. Goodrich Chemical Co., 2060 East Ninth Street, Cleveland 15, Ohio.
[2] A medium high acrylonitrile-butadiene polymer sold by B. F. Goodrich Chemical Co., 2060 East Ninth Street, Cleveland 15, Ohio.
[3] Butadiene-styrene copolymer sold by Phillips Chemical Co., Rubber Chemicals Division, 318 Water Street, Akron 8, Ohio.

The recipes in Table I were compounded according to conventional rubber compounding technique with one exception. It has been found that zinc oxide is best added on the sulfur mill and not before, i.e., it is added with the sulfur-containing curing agent subsequent to admixing the copolymeric constituents and silica. This method prevents scorching which otherwise occurs. Curing time for each of the above recipes was 20 minutes at 163° C.

The vulcanizates prepared from recipes A, B and C were exceptional when treated for Shore D hardness and N.B.S. abrasion index. In addition, their modulus, tensile and tear resistance qualities were very good. Quite obviously, therefore, these vulcanizates are particularly desirable for ladies' top lifts, casters, football shoe caulks, and the like.

It will be apparent to the skilled rubber chemist or technologist that numerous modifications may be made in the teachings of the instant discovery without departing from the substance thereof.

Furthermore, while the present invention has been described in detail with respect to certain embodiments thereof, it is not intended that the invention be restricted to these details, except insofar as they appear in the appended claims.

I claim:
1. A rubber vulcanizate having improved wear resistance which comprises an elastic, metallo-carboxylate polymer of an open-chain, aliphatic conjugated diene, a member selected from the group consisting of butadiene-styrene copolymers and acrylonitrile-butadiene copolymer, said metallo-carboxylate polymer being present in the proportion of 25 to 95 parts by weight based upon 100 parts by weight of the combined polymers, and from 20 to 90 parts by weight per 100 parts of the combined weight of said polymers of a finely-divided, hydrated, precipitated silica having an average ultimate particle size below 0.1 micron.

2. A rubber vulcanizate having improved wear resistance which comprises an elastic, metallo-carboxylate polymer of an open-chain, aliphatic conjugated diene, a member selected from the group consisting of butadiene-styrene copolymers and acrylonitrile-butadiene copolymers, said metallo-carboxylate polymer being present in the proportion of 25 to 95 parts by weight based upon 100 parts by weight of the combined polymers, and from 20 to 90 parts by weight per 100 parts of the combined weight of said polymers of a finely-divided, hydrated, precipitated silica having an average ultimate particle size below 0.1 micron and a surface area in the range of from 50 to 250 square meters per gram.

3. A rubber vulcanizate having improved wear resistance which comprises an elastic, metallo-carboxylate polymer of an open-chain, aliphatic conjugated diene, a member selected from the group consisting of butadiene-styrene copolymers and acrylonitrile-butadiene copolymers, said metallo-carboxylate polymer being present in the proportion of 25 to 95 parts by weight based upon 100 parts by weight of the combined polymers, and from 20 to 90 parts by weight per 100 parts of the combined weight of said polymers of a finely-divided, hydrated, precipitated silica having an average ultimate particle size below 0.1 micron and a surface area in the range of from 50 to 250 square meters per gram, said silica containing at least 90 to 95 percent by weight $SiO_2$ on an anhydrous basis.

4. The rubber vulcanizate of claim 3 in which the copolymer is butadiene-styrene.

5. The rubber vulcanizate of claim 3 in which the copolymer is butadiene-acrylonitrile.

6. A method of preparing a rubber vulcanizate having improved wear resistance which comprises forming an initial mix of a plastic carboxyl-containing polymer of an open-chain, aliphatic conjugated diene, a member selected from the group consisting of butadiene-styrene copolymers and acrylonitrile-butadiene copolymers, and from 20 to 90 parts by weight per 100 parts of the combined weight of said polymers of a finely-divided, precipitated, hydrated silica having an average ultimate particle size below 0.1 micron wherein said carboxyl-containing polymer is present in the proportion of 25 to 95 parts by weight based upon 100 parts by weight of the combined polymers, adding a sulfur-containing curing agent to this initial mix, incorporating zinc oxide in the initial mix but not before the sulfur-containing curing agent is included therein and thereafter vulcanizing the composition.

7. A method of preparing a rubber vulcanizate having improved wear resistance which comprises forming an initial mix of a plastic carboxyl-containing polymer of an open-chain, aliphatic conjugated diene, a member selected from the group consisting of butadiene-styrene copolymers and acrylonitrile-butadiene copolymers, and from 20 to 90 parts by weight per 100 parts of the combined weight of said polymers of a finely-divided, precipitated, hydrated silica having an average ultimate particle size below 0.1 micron wherein said carboxyl-containing polymer is present in the proportion of 25 to 95 parts by weight based upon 100 parts by weight of the combined polymers, adding a sulfur-containing curing agent to this initial mix, incorporating polyvalent metallic oxide curing agent in the initial mix but not before the sulfur-containing curing agent is included therein and thereafter vulcanizing the composition.

References Cited in the file of this patent

UNITED STATES PATENTS

| | | |
|---|---|---|
| 2,576,148 | Schechtman | Nov. 27, 1951 |
| 2,681,327 | Brown | June 15, 1954 |
| 2,692,869 | Pechukas | Oct. 26, 1954 |
| 2,702,284 | Brock | Feb. 15, 1955 |

UNITED STATES PATENT OFFICE
CERTIFICATE OF CORRECTION

Patent No. 3,038,872 June 12, 1962

Ralph F. Wolf

It is hereby certified that error appears in the above numbered patent requiring correction and that the said Letters Patent should read as corrected below.

Column 4, line 47, for "to", first occurrence, read -- 2 --; column 6, lines 20 and 21, for "copolymer" read -- copolymers --.

Signed and sealed this 12th day of November 1963.

(SEAL)
Attest:
ERNEST W. SWIDER

EDWIN L. REYNOLDS

Attesting Officer

Acting Commissioner of Patents